US007999846B2

(12) United States Patent
Kiyohara et al.

(10) Patent No.: US 7,999,846 B2
(45) Date of Patent: Aug. 16, 2011

(54) IMAGE PROCESSING APPARATUS, IMAGE PROCESSING SYSTEM, AND RECORDING MEDIUM FOR PROGRAMS THEREFOR

(75) Inventors: Masahiro Kiyohara, Ibaraki (JP); Kazunori Takahashi, Ibaraki (JP); Chieko Onuma, Ibaraki (JP); Wataru Ito, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1447 days.

(21) Appl. No.: 11/477,779

(22) Filed: Jun. 30, 2006

(65) Prior Publication Data

US 2007/0126868 A1   Jun. 7, 2007

(30) Foreign Application Priority Data

Dec. 6, 2005   (JP) ................. 2005-352402

(51) Int. Cl.
*H04N 7/18* (2006.01)
*G06K 9/34* (2006.01)
(52) U.S. Cl. ...................... 348/143; 382/173
(58) Field of Classification Search .............. 348/143, 348/169, 397, 398, 403, 404, 405; 382/56, 382/41, 232, 118, 176, 177, 173, 190, 115, 382/218, 132, 191, 192, 193, 194, 195, 181, 382/185, 188, 224, 225, 226, 228, 158, 159, 382/161, 102
See application file for complete search history.

(56) References Cited

U.S. PATENT DOCUMENTS

| 2004/0052413 A1* | 3/2004 | Kunii et al. | 382/159 |
| 2005/0201595 A1* | 9/2005 | Kamei | 382/118 |
| 2006/0008145 A1* | 1/2006 | Kaku | 382/173 |
| 2006/0222243 A1* | 10/2006 | Newell et al. | 382/173 |

FOREIGN PATENT DOCUMENTS

| JP | 9-44676 A | 2/1997 |
| JP | 9-138470 A | 5/1997 |
| JP | 2003-99777 A | 4/2003 |
| JP | 2005-269473 A | 9/2005 |

OTHER PUBLICATIONS

Wataru Ito et al., "An Cooperative Intruder Surveillance System Using Master and Slave Cameras", Symposium on Recognition and Comprehension of Image 2000, Jul. 18, 2000, pp. II-229-II-234, The Institute of Electronics, Information and Communication Engineers.
Masato Kazui et al., "A Study of Face Detection Using Peripheral Increment Sign", Workshop on Practical Application of a Vision Technology, Dec. 2, 2004, pp. 1-4, The Japan Society for Precision Engineering.
Paul Viola et al., "Rapid Object Detection Using a Boosted Cascade of Simple Features", Proceedings of the 2001 IEEE Computer Society Conference on Computer Vision and Pattern Recognition, 2001, pp. I-511-I-518, IEEE Computer Society.
Japanese Office Action dated Sep. 28, 2010 (Three (3) pages).

* cited by examiner

*Primary Examiner* — Behrooz Senfi
(74) *Attorney, Agent, or Firm* — Crowell & Moring LLP

(57) ABSTRACT

An image processing apparatus connected to a monitoring camera and a display for processing an image input from the monitoring camera includes an image storage storing an image input from the monitoring camera, a characteristic parameter storage storing a characteristic parameter characterizing a specific image, a specific image extraction unit, wherein the specific image extraction unit cuts out images having a plurality of predetermined sizes from all parts of the input image stored in the image storage, executes character evaluation processing for checking whether or not cut out images have an identical character to the specific image for each cut out image, and extracts the cut out images which has an identical character to the specific image by the character evaluation processing, and a display image generation unit for generating a display image for displaying a whole image of the input image and the extraction specific image on the display.

11 Claims, 12 Drawing Sheets

IMAGE PROCESSING APPARATUS, IMAGE PROCESSING SYSTEM, AND RECORDING MEDIUM FOR PROGRAMS THEREFOR

CROSS REFERENCE TO RELATED APPLICATIONS

This application claims the foreign priority benefit under Title 35, United States Code, §119(a)-(d) of Japanese Patent Application No. 2005-352402, filed on Dec. 6, 2005, the contents of which are hereby incorporated by reference.

BACKGROUND OF THE INVENTION

1. Field of the Invention

The present invention relates to an image processing apparatus, an image processing system, and a recording medium for programs therefor, which are suitable for image processing of a monitoring image by a high-definition monitoring camera.

2. Description of Relevant Art

In the present day, a monitoring camera is installed at an entrance of a building and a parking area, at a gate of a factory site and a school site, and an inside of a shop such as a large-scale store and a convenience store, and a people flow is monitored in real time by a facility administrator or a security guard, and at the same time, the monitoring image is simultaneously stored in a storage medium such as a magnetic tape and a magnetic disk. A major purpose of the monitoring is to perceive a person displayed on the monitoring image as a mobile object and to identify who he/she is, as well as tracking a flow line of the person. That is, when a suspicious person is checked using a real time monitoring image, or when an accident occurred in the neighborhood, stored images in the past are used for finding and confirming a criminal.

Meanwhile, in recent years, with digitalization of a monitoring camera and a progress of high-definition technology (for example, six million pixels), a wider range of monitoring has become available, and in addition, it has become possible to obtain personal facial characteristics and expressions in detail. On the other hand, since an imaging capability of the high-definition monitoring camera exceeds a displaying capability of a common display apparatus, a whole imaged monitoring image can not be displayed on the apparatus as it is. Therefore, for displaying the whole monitoring image in one screen, the image must be displayed by lowering the resolution. In a display of low resolution, the personal facial characteristics and expressions can not be displayed in detail.

Then, for example, when finding a suspicious person, or when tracking a found suspicious person, it is necessary to restore a part of the image which includes, for example, a face of the suspicious person to the high-definition image, as needed. However, for restoring the image to the high-definition image, a display area is required to be assigned. Since a person who should be displayed with high-definition image moves by the minute in the monitoring image, a manual operation of the monitoring camera is practically impossible.

Therefore, for eliminating the above issues, for example, an example of a monitoring camera system, a slave camera is used for monitoring a part in detail is arranged in addition to a master camera which monitors a whole. And a specific part of the image, such as a human area and a facial area in the image is tracked by the slave camera as well as imaging the specific part of the image by zooming, is disclosed in a first non-patent literature, Ito et al, "An cooperative Intruder Surveillance System using Master and Slave Cameras", Symposium on recognition and comprehension of image 2000, The Institute of Electronics, Information and Communication Engineers, Jul. 18, 2000, p.II 229-p.II 234. In addition, an automatic detection of a human face or the like is required for tracking a person or the like in the monitoring image. Examples of calculation methods for detecting a human face from a monitoring image using a computer are disclosed in a second non-patent literature, Kazui et al, "A Study of Face Detection Using Peripheral Increment Sign", Workshop on practical application of a vision technology, The Japan Society for Precision Engineering, Dec. 2, 2004, and a third non-patent literature, Paul Viola et al, "Rapid Object Detection using a Boosted Cascade of Simple Features", Proceedings of the 2001 IEEE Computer Society Conference on Computer Vision and Pattern Recognition, IEEE Computer Society, 2001, p.I 511-p.I 518.

In the monitoring system disclosed in the first non-patent literature, a camera number corresponding to a tracking target number is required. Therefore, if the monitoring system is applied to a place where many peoples pass through or come in and out, many slave cameras must be installed. In this case, a system cost becomes high, and practically, securing of an installation space for the slave cameras becomes hard. Accordingly, when a number of slave cameras as many as that of the monitoring targets can not be installed, a monitoring omission may happen, or a real time manual selection of the monitoring target by an observer will be required.

In addition, when the tracking targets such as faces of many peoples are automatically extracted from a high-definition monitoring image, since a processing target area is wide and the tracking targets are many, a processing time for the extraction becomes long. In this case, since a capability of the extraction processing is not sufficient for an input monitoring image which is input with a predetermined interval, a frame dropping of the monitoring image may be caused. If the frame dropping is caused, a monitoring oversight may be caused.

Meanwhile, the high-definition camera is not practically used for a monitoring camera. Therefore, there has been no proposal in the past on how to display the high-definition monitoring image on a low capability display apparatus and how to use the displayed image for the monitoring.

It is, therefore, an object of the present invention to provide an image processing apparatus, an image processing system, and a recording medium for programs therefor, which can extract a monitoring target such as a human face from a high-definition monitoring image obtained by a high-definition monitoring camera within a predetermined time without dropping frames, and can display the extracted monitoring target as a high-definition image, by considering the aforementioned conventional technical issues.

SUMMARY OF THE INVENTION

According to a first aspect of the present invention, there is provided an image processing apparatus connected to a monitoring camera and a display, which includes an image storage unit for storing an image including an input image input from the monitoring camera; a characteristic parameter storage unit for storing a characteristic parameter characterizing a specific image extracted from the input image; Here, a specific image is a smaller image cut out from the input image such as a human area and a facial area in the input image; a specific image extraction unit, wherein the specific image extraction unit cuts out images having a plurality of predetermined sizes from all parts of the input image stored in the image storage unit, executes character evaluation processing for checking whether or not cut out images have an identical character to the specific image characterized by the characteristic parameter for each cut out image, and extracts the cut out images which are determined to have an identical character to the specific image by the character evaluation processing as an extraction specific image; and a display image generation unit for generating a display image for displaying a whole image of the input image and the extraction specific image on the display.

In the invention, a character of the specific image to be extracted is expressed by the characteristic parameters, and based on the parameters, an image cut out from the input monitoring image is checked whether or not the image has a character identical to that of the specific image. Therefore, various kinds of objects, such as a male face, a female face, a child face, and a face with glasses, other than a simple face can be easily set as a specific image to be extracted. In addition, in the image processing apparatus according to the present invention, the display image for displaying a whole image of the monitoring image and the extraction specific image on the same display is generated. Accordingly, the observer of the display image can know individualistically a focused phenomenon extracted as the specific image in detail, while obtaining the outline and key points of the phenomenon presented from the whole monitoring image by watching the display image with the display.

According to a second aspect of the present invention, there is provided an image processing apparatus, wherein the characteristic parameter storage unit stores a plurality of sets of the characteristic parameters, wherein the specific image extraction unit executes the character evaluation processing for each of the plurality of sets of the characteristic parameters stored in the characteristic parameter storage unit, and when the cut out image is determined to have identical character to the specific image in every executed character evaluation processing, extracts the cut out image as the extraction specific image.

In the invention, since the image processing apparatus executes the character evaluation processing between the specific images expressed by the plurality of sets of the characteristic parameters, the specific image can be extracted through characters obtained by multiple points of views.

According to a third aspect of the present invention, there is provided an image processing apparatus, wherein when a predetermined limit time, which is set in advance, elapses before completing the character evaluation processing for all the plurality of sets of the characteristic parameters, the specific image extraction unit extracts the extraction specific image based on a processing result of the character evaluation processing executed before the predetermined limit time elapses.

In the invention, when the predetermined limit time, which is set in advance, elapses by consuming the time for the character evaluation processing, the image processing apparatus determines whether or not the specific image is detected based on the result of the character evaluation processing executed before the predetermined limit time elapses. Accordingly, the extracted specific image can be displayed without dropping frames even if the monitoring image is input sequentially with a given interval.

According to a fourth aspect of the present invention, there is provided an image processing apparatus which further includes a character evaluation processing control unit for setting a priority of the processing in regard to the character evaluation processing for the plurality of sets of the characteristic parameter, wherein the specific image extraction unit executes the character evaluation processing for the plurality of sets of the characteristic parameter based on the priority set by the character evaluation processing control unit.

According to a fifth aspect of the present invention, there is provided an image processing apparatus which further includes a processing progress information storage unit for storing processing progress information of the character evaluation processing, wherein the character evaluation processing control unit stores identification information of the characteristic parameter indicating that the character evaluation processing is not processed in the processing progress information storage unit when the predetermined limit time elapses before the specific image extraction unit completes the character evaluation processing for all the plurality of sets of the characteristic parameter and the extraction specific image is extracted, reads out the identification information of the characteristic parameter indicating that the character evaluation processing is not processed from the processing progress information storage unit when the predetermined limit time remains after the specific image extraction unit completes the character evaluation processing for all the plurality of sets of the characteristic parameter, and makes the specific image extraction unit execute the character evaluation processing for the characteristic parameter identified by read out identification information.

In the fourth and fifth aspects of the invention, the image processing apparatus executes the character evaluation processing according to the priority, as well as setting the priority of the character evaluation processing for the plurality of sets of the characteristic parameter. In addition, when the processing time becomes short for the character evaluation processing, the progress information of the processing is stored once in the processing progress information storage unit, and executes the remaining processing when the processing time is sufficient. Accordingly, when the monitoring image is monitored in real time, the extracted specific image is displayed on the display without dropping frames, and in addition, when the monitoring image is used in off-line, the specific image which is extracted with high accuracy can be displayed on the display.

In addition, the above-described image processing apparatus according to the invention is characterized in that the display image generation unit generates a following display image. (1) The display image generation unit generates the shrunk whole image, which lowers the image quality, of the whole image of the input image in the display image. (2) The display image generation unit generates the display image where the extraction specific images are arranged at outside of the shrunk whole image, and further generates the lead lines connecting the part where the extraction specific images are extracted in the shrunk whole image and the extraction specific images which are arranged at outside of the shrunk whole image. (3) The display image generation unit generates the shrunk whole image such that the shrunk whole image is projected on the screen arranged to face obliquely-forward in the display image. (4) The display image generation unit arranges the extraction specific images at the position of the part where the extraction specific images are extracted in the shrunk whole image.

In the above invention, the image processing apparatus generates the display image displaying the shrunk whole image which is shrunk from the whole image of the monitoring image by lowering the image quality and the extracted specific image on the same display. Therefore, a high-definition monitoring image which is imaged by a high-definition camera can be displayed on a low capability display. In addition, in this case, since a part where the specific image is extracted in the shrunk whole image and the extracted image in the part are displayed by being related each other with, for example, the lead line, an observer of the monitoring image can know a movement of the specific image in the monitoring image, the same way as the observer can observe the extracted specific image in detail.

Meanwhile, the present invention includes an image processing method and programs for operating the above-described image processing apparatuses.

Through the above, according to the present invention, it is capable of displaying a monitoring image without dropping frames, displaying a whole image of the monitoring image, and displaying a high-definition image with respect to an important part of the image for monitoring, such as a human face.

DETAILED DESCRIPTION OF THE PREFERRED EMBODIMENT

First Embodiment

Herein below, a first embodiment of the present invention will be explained in detail by referring to FIGS. 1 to 8, as needed.

Figure 1:
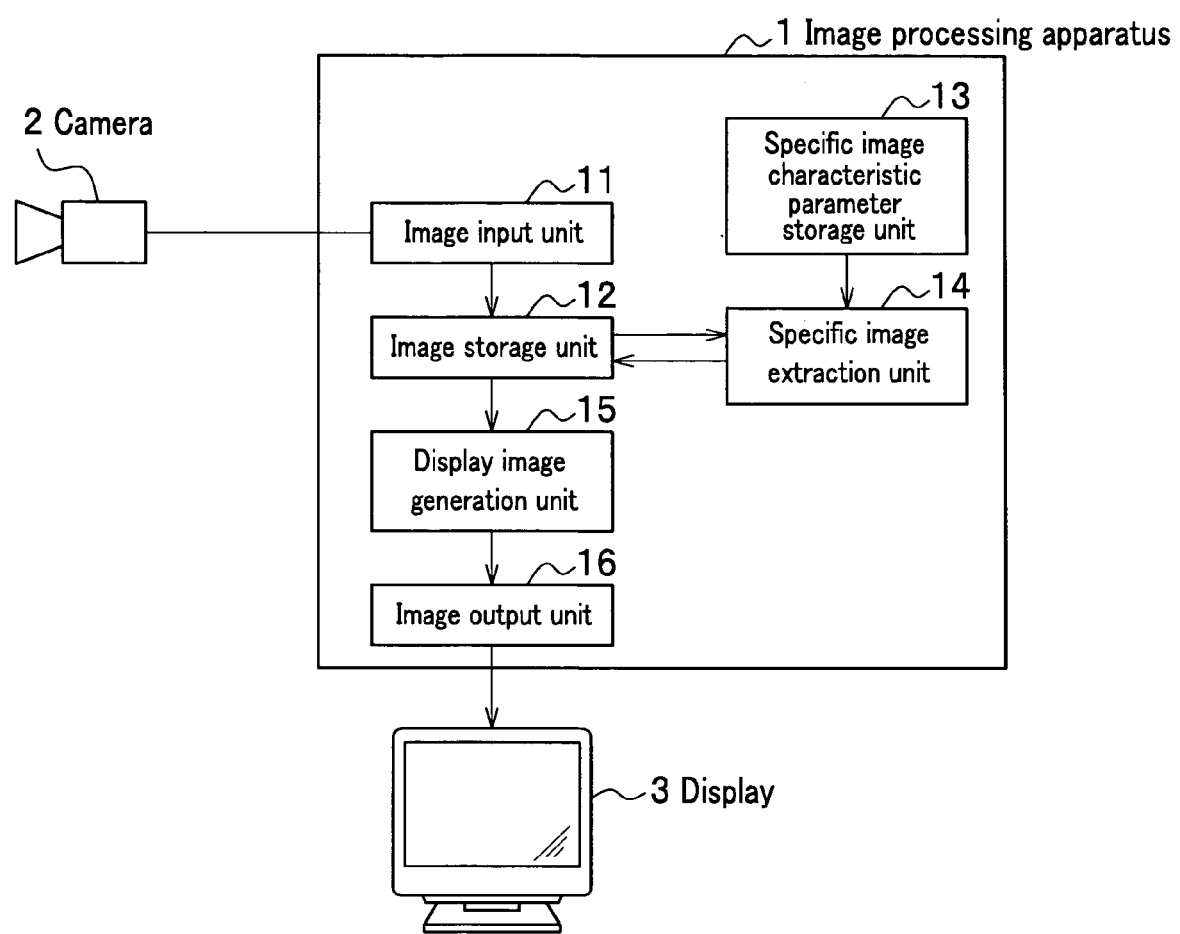
FIG. 1 is an illustration showing an example of a configuration of an image processing apparatus according to the first embodiment of the present invention.

FIG. 1 is an illustration showing an example of a configuration of an image processing apparatus according to a first embodiment of the present invention. As shown in FIG. 1, an image processing apparatus 1 is connected to a monitoring camera 2 and a display 3, and includes, for example, an image input unit 11, an image storage unit 12, a specific image characteristic parameter storage unit 13, a specific image extraction unit 14, a display image generation unit 15, and an image output unit 16.

The image input unit 11 receives an image signal transmitted from the monitoring camera 2, and when the image signal is an analog signal, the image input unit 11 converts the analog signal into a digital signal using an A/D (Analog to Digital) converter and stores the converted image data in the image storage unit 12. In addition, when the image signal is a digital signal, the image input unit 11 stores the image data in the image storage unit 12 after performing communication processing with the monitoring camera 2 and an error correction. Meanwhile, the monitoring camera 2 is a high-definition camera with high resolution such as a high-definition spec.

The image storage unit 12 stores image data input from the monitoring camera 2 by the image input unit 11, reads and writes the stored image data in response to a request of the specific image extraction unit 14 and the display image generation unit 15, and changes or adds a whole or a part of the image data, as needed. Meanwhile, in the specification, "image data" may be simply written as "image" in some case if there is no possibility to be mistaken.

The specific image characteristic parameter storage unit 13 stores a characteristic parameter which is necessary for detecting a specific image, that is, a monitoring target, for example, a human face. The specific image characteristic parameter is calculated in advance from a predetermined teacher data and a learning program before operating the image processing apparatus 1, and stored in the specific image characteristic parameter storage unit 13.

The specific image extraction unit 14 evaluates whether or not an image has an identical character to that of a specific image by using the specific image characteristic parameter stored in the specific image characteristic parameter storage unit 13, for all arbitrary area of input image data input from the monitoring camera 2 and stored in the image storage unit 12. If the image has the identical character, the specific image extraction unit 14 extracts the image data, and stores the data in the image storage unit 12. Meanwhile, processing of the specific image extraction unit 14 in detail will be described later.

The display image generation unit 15 generates a shrunk image which is lowered a resolution so that a whole image of the image input from the monitoring camera 2 can be displayed on a display screen of the display 3. Then, the display image generation unit 15 generates a display image for displaying both the shrunk image of the whole image and the image having the identical character to that of the specific image which is extracted by the specific image extraction unit 14 on the display screen of the display 3. Meanwhile, an example of the display image will be described later in detail by referring to FIG. 2.

The image output unit 16 outputs display image data generated by the display image generation unit 15 to the display 3 based on a predetermined interface spec. Here, the display 3 is, for example, a LCD (Liquid Crystal Display) display and a CRT (Cathode Ray Tube) display, and a higher display capability (for example, a pixel number) is preferable, but it does not matter if not higher.

The above-described image processing apparatus 1 is configured with a computer which includes a CPU (Central Processing Unit) composed of, for example, an arithmetic device (not shown) and a storage unit, such as a semiconductor memory and a hard disk storage unit. In this case, an entity of the image storage unit 12 and specific image characteristic parameter storage unit 13 is a storage area assigned to a part of the storage unit. In addition, the specific image extraction unit 14 and the display image generation unit 15 are actualized by the CPU executing predetermined programs stored in the storage unit. Also, the image input unit 11 and the image output unit 16 are actualized by using an interface circuit for the input or the output and by executing programs for driving and controlling the interface circuit by the CPU.

Figure 2:
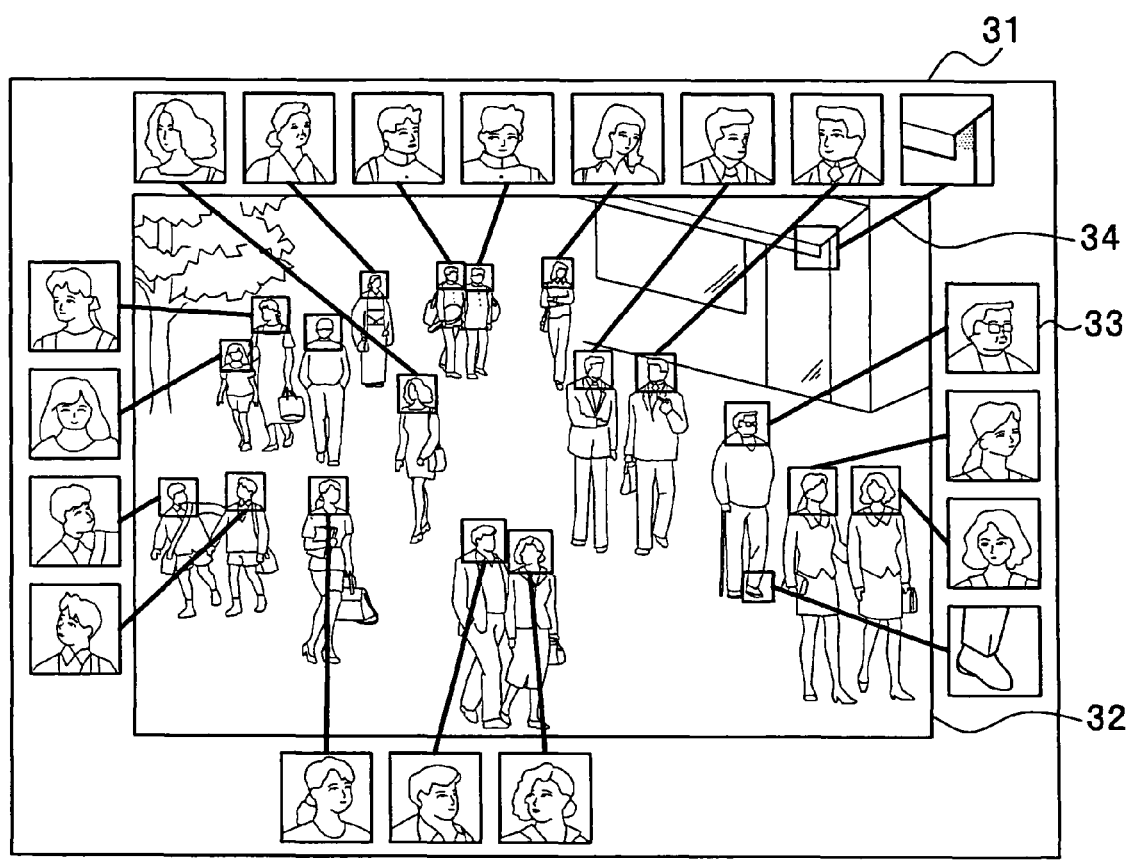
FIG. 2 is an illustration showing an example of a display image displayed on a display by the image processing apparatus according to the first embodiment.

FIG. 2 is an illustration showing an example of a display image displayed on a display by an image processing apparatus according to the first embodiment of the present invention. As shown in FIG. 2, on a display image 31 displayed on a screen of the display 3, a shrunk whole image 32 which is shrunk from a whole high-definition monitoring image input from the monitoring camera 2 by lowering the resolution and a specific image 33 extracted by the specific image extraction unit 14 are displayed. In this case, the shrunk whole image 32 is arranged at approximately a center of the display image 31, and the extracted specific image 33 is arranged around the shrunk whole image 32. In addition, the extracted specific image 33 is displayed without lowering the resolution. Meanwhile, "the extracted specific image 33 is displayed without lowering the resolution" means that "the extracted specific image 33 is displayed without lowering the resolution as much as the shrunk whole image 32". A resolution of the specific image 33 may be lowered as needed within a practical range according to a monitoring purpose.

In FIG. 2, a specific image of an extraction target is a human face. Therefore, a human face is extracted from a whole image of a monitoring image, and the extracted human face, that is, the extracted specific image 33 is displayed around a shrunk whole image 32 without lowering the resolution. Accordingly, an observer can see facial characteristics and expressions in detail as fine as can be used for a monitoring purpose from the human face displayed without lowering the resolution.

In addition, in FIG. 2, a lead line 34 which connects the specific image 33 (a human face) and a face portion of a person in the shrunk whole image 32 is displayed so that it can be easily seen which person in the shrunk whole image 32 corresponds to the extracted human face. Further, since the shrunk whole image 32 of the monitoring image is displayed in the display image 31 displayed on the display 3 in FIG. 2, a flow line of each person can be monitored, looking at the display image 31 at a given interval.

Meanwhile, in FIG. 2, a space under eaves of a house and a human foot are shown as extracted noise examples by an erroneous detection of the specific image in the specific image extraction unit 14.

Figure 3:
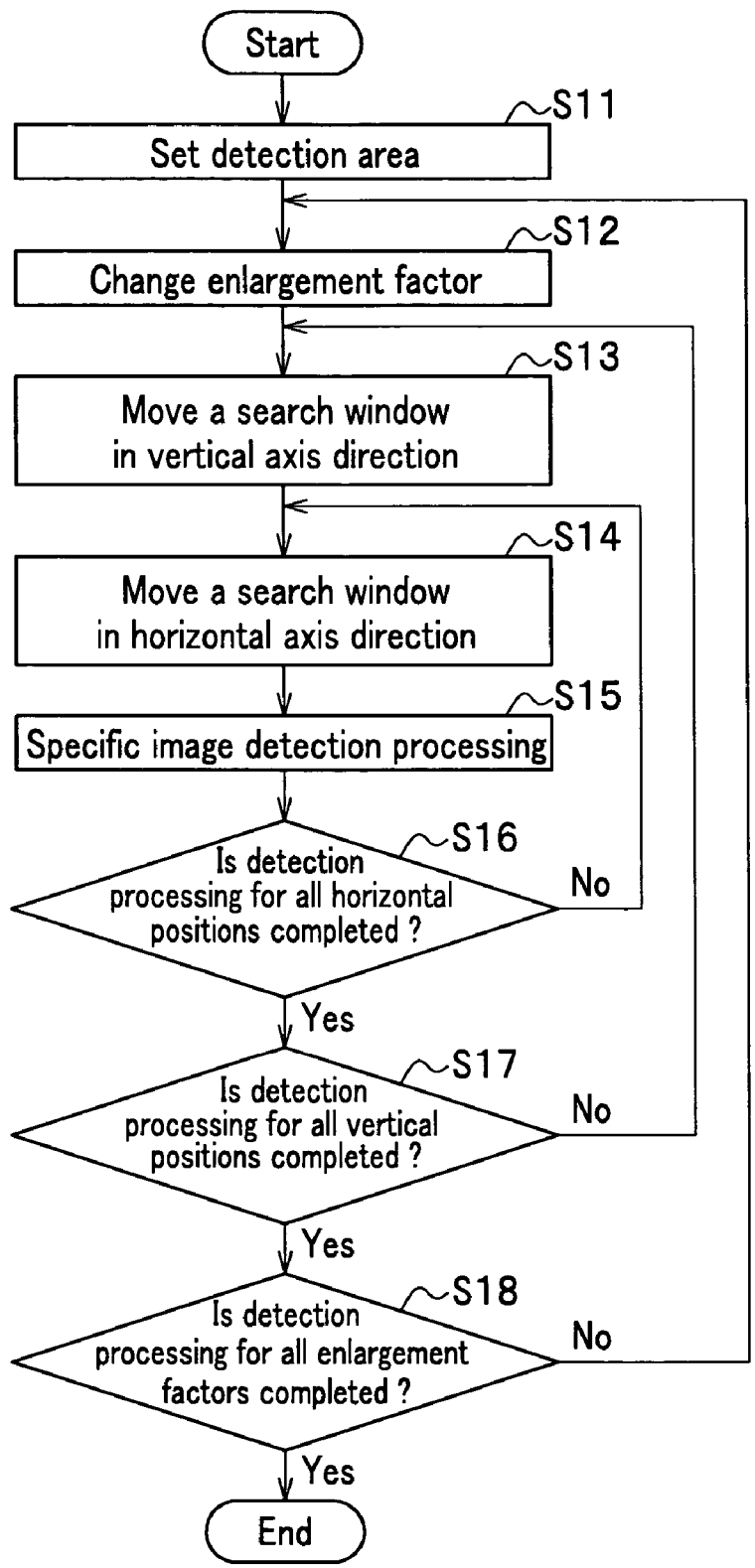
FIG. 3 is a flowchart showing an example of a flow of specified image extraction processing according to the first embodiment.
Figure 4:
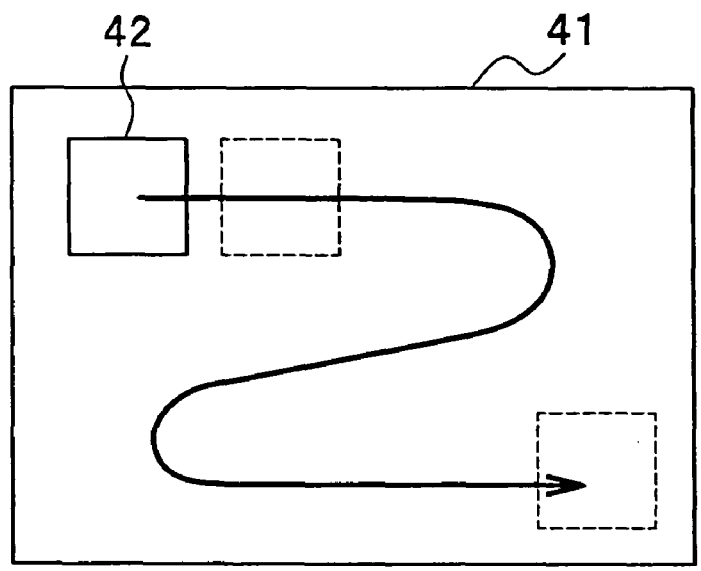
FIG. 4 is an illustration showing an example of an order for moving a detection target area in the specific image extraction processing according to the first embodiment.
Figure 5:
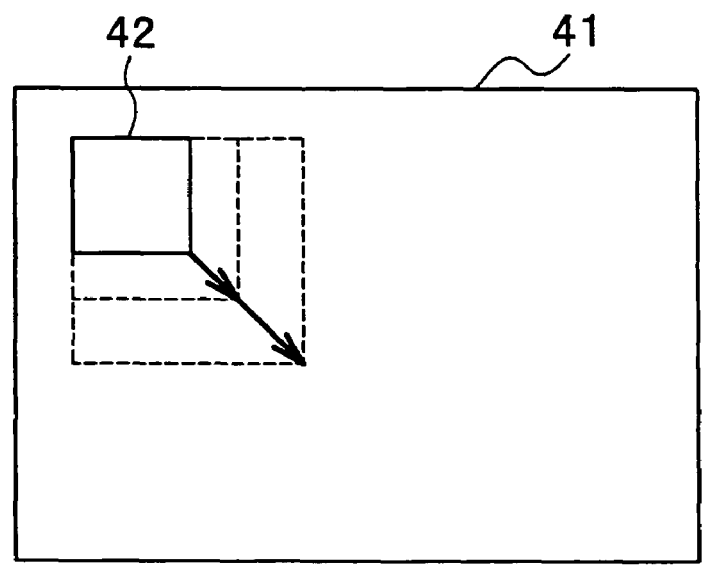
FIG. 5 is an illustration showing an example for changing an enlargement factor of a detection target area in the specific image extraction processing according to the first embodiment.

Next, specific image extraction processing to be executed by the specific image extraction unit 14 will be explained in detail by referring to FIGS. 3 to 8. Here, FIG. 3 is a flowchart showing an example of a flow of the specific image extraction processing according to the first embodiment of the present invention. FIG. 4 is an illustration showing an example of an order for moving a detection target area in the specific image extraction processing. FIG. 5 is an illustration showing an example for changing an enlargement factor in the specific image extraction processing.

In the specific image extraction processing, the specific image extraction unit 14 cuts out an area from an input image, which is input from the monitoring camera 2 and stored in the image storage unit 12, as a specific image detection target area, and checks whether or not a character of the cut out image is identical to that of a specific image (for example, a human face) which is set in advance. If determined to be identical, the cut out image is stored in the image storage unit 12 as an extraction specific image.

As shown in FIG. 3, the specific image extraction processing of the specific image extraction unit 14 starts when the image input unit 11 inputs image data from the monitoring camera 12 and stores the image data in the image storage unit 12. Then, when the specific image extraction processing starts, the specific image extraction unit 14 (that is, CPU (not shown) in image processing apparatus 1) first sets a detection target area 42 (refer to FIG. 4) for detecting a specific image in the input image (step S11). The detection target area 42 has, as shown in FIG. 4, a predetermined size and set at, for example, upper left of an input image 41.

When the detection target area 42 is set, by skipping steps S12 to S14 at only first time, an image of the detection target area 42 is cut out, and the specific image detection processing is executed (step S15). Meanwhile, the specific image detection processing will be explained later in detail by referring to FIGS. 7 and 8.

When the specific image detection processing for the set detection target area 42 is completed, next, a detection target area 42 is reset in another area of the input image. Here, resetting of the detection target area 42 is, as shown in FIG. 4, repeated until the detection target area 42 reaches a right end by moving the detection target area 42 in a horizontal axis direction bit by bit (horizontal axis direction scan). In addition, when one of the horizontal axis direction scans is completed, another horizontal axis direction scan is repeated again by lowering a vertical axis position of the detection target area 42 a bit, and repeats the scan until a vertical axis position of the detection target area 42 reaches the bottom position of the input image 41 (vertical axis direction scan).

That is, in FIG. 3, the specific image extraction unit 14 checks whether or not the specific image detection processing is completed for all horizontal axis positions after completing the specific image detection processing (step S16), and if the processing is not completed for the all horizontal axis positions (step 16: No), the processing returns to step S14 and executes the specific image detection processing again (step S15) by moving the detection target area 42 to the horizontal axis direction (step S14). In addition, when the specific image detection processing is completed for all horizontal positions (step 16: Yes), the specific image extraction unit 14 checks whether or not the specific image detection processing is completed for all vertical axis positions (step S17). If the specific image detection processing is not completed for the all vertical axis positions (step 17: No), the processing returns to step S13, and executes the steps S14 to S16 again by moving the detection target area 42 to the vertical axis direction (step S13). In addition, from the check at the step S17, if it is found that the steps S14 to S17 are completed for the all vertical axis positions (step S17: Yes), the horizontal and vertical axis direction scans of the detection target area 42 with a given size and the specific image detection processing at each position are completed.

Then, as shown in FIG. 5, by enlarging or shrinking the detection target area 42 bit by bit and by repeating the horizontal axis direction scan and the vertical axis direction scan of the detection target area 42 with each enlargement factor, the specific image detection processing is executed.

That is, when the specific image extraction unit 14 completes the horizontal axis direction scan, vertical axis direction scan, and specific image detection processing at each position of the detection target area 42 with a given size (step S17: Yes), subsequently, the specific image extraction unit 14 checks whether or not the specific image detection processing is completed for all enlargement factors (step S18). If the specific image detection processing is not completed for the all enlargement factors (step S18: No), the processing returns to the step S12, and executes the steps S12 to S17 again by changing the enlargement factor of the detection target area 42 (step S12). If the specific image detection processing is completed for all the enlargement factors (step S18: Yes), the specific image detection processing ends.

Figure 6:
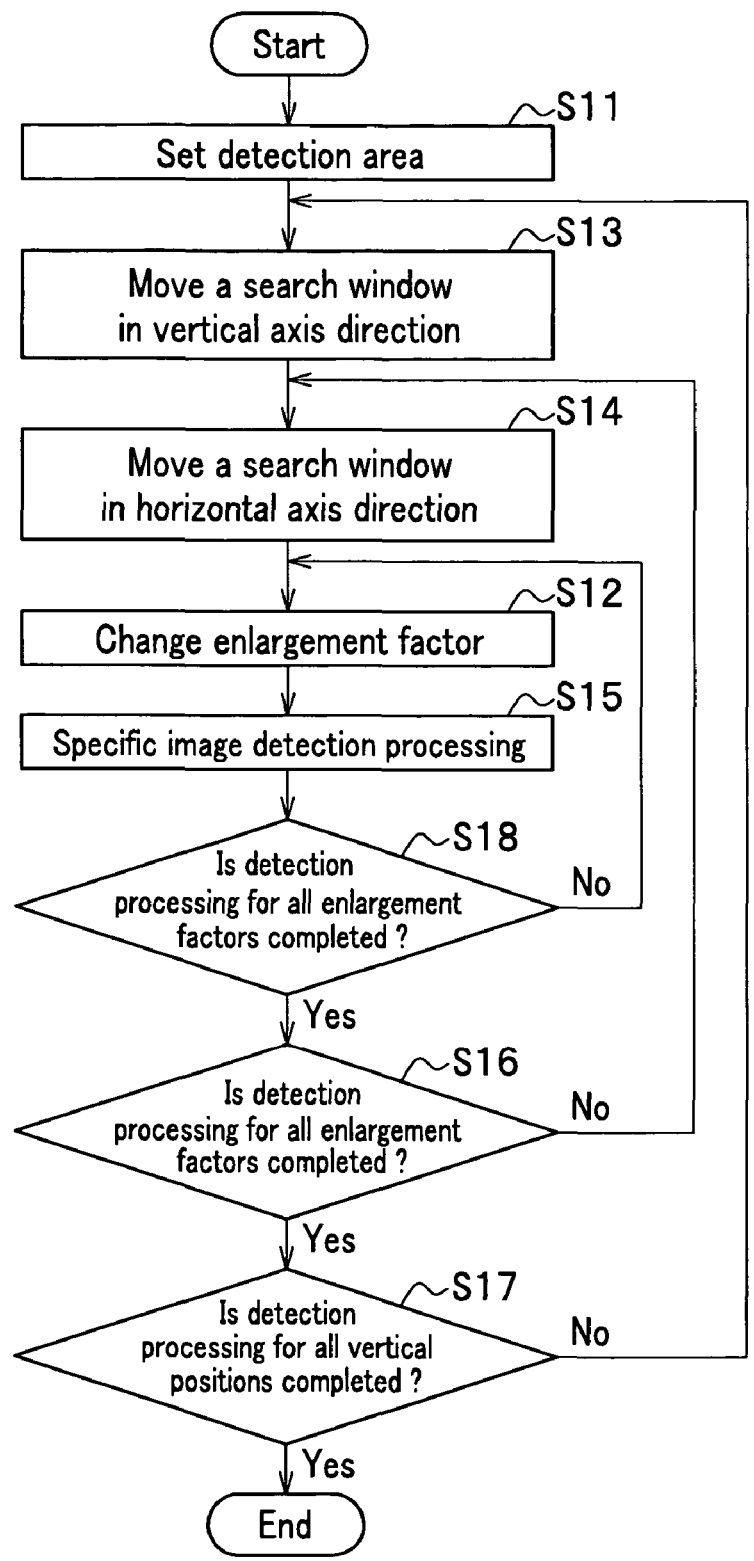
FIG. 6 is a flowchart showing an example of a flow of the specific image extraction processing when an assignment of a detection target area is implemented with an order of "change of enlargement factor"→"movement in horizontal axis direction"→"movement in vertical axis direction", in the specific image extraction processing according to the first embodiment.

Here, regarding the enlargement factor of the detection target area 42, it is not necessary to set every enlargement factors acceptable in the input image 41. The enlargement factor may be sufficient if it is in a practical range by considering a size of the specific image which is imaged in the input image 41. In addition, here, the setting of the detection target area 42 is executed in the following order. "Move a search window in horizontal axis direction"→"Move a search window in vertical axis direction"→"change enlargement factor". However, the order is not limited thereto. FIG. 6 is a flowchart showing an example of a flow of the specific image extraction processing when the setting of detection target area is executed in the following order. "change enlargement factor"→"Move a search window in horizontal axis direction"→"Move a search window in vertical axis direction".

A difference between the processing flow shown in FIG. 6 and that of shown in FIG. 3 is that the processing for changing the enlargement factor (step S12) and the processing for checking whether or not the specific image detection processing is completed for all enlargement factors (step S18) are set inside the repeating processing of the steps S14 to S16. Because of the above, the setting of the detection target area 42 is executed by the following order. "change enlargement factor"→"Move a search window in horizontal axis direction"→"Move a search window in vertical axis direction".

Meanwhile, in principle, an extraction result of a specific image is not changed by changing an order of the setting of the detection target area 42. However, practically, the extraction result may be changed a bit, for example, by a moving step value and a step value of the enlargement factor, but not much.

Figure 7:
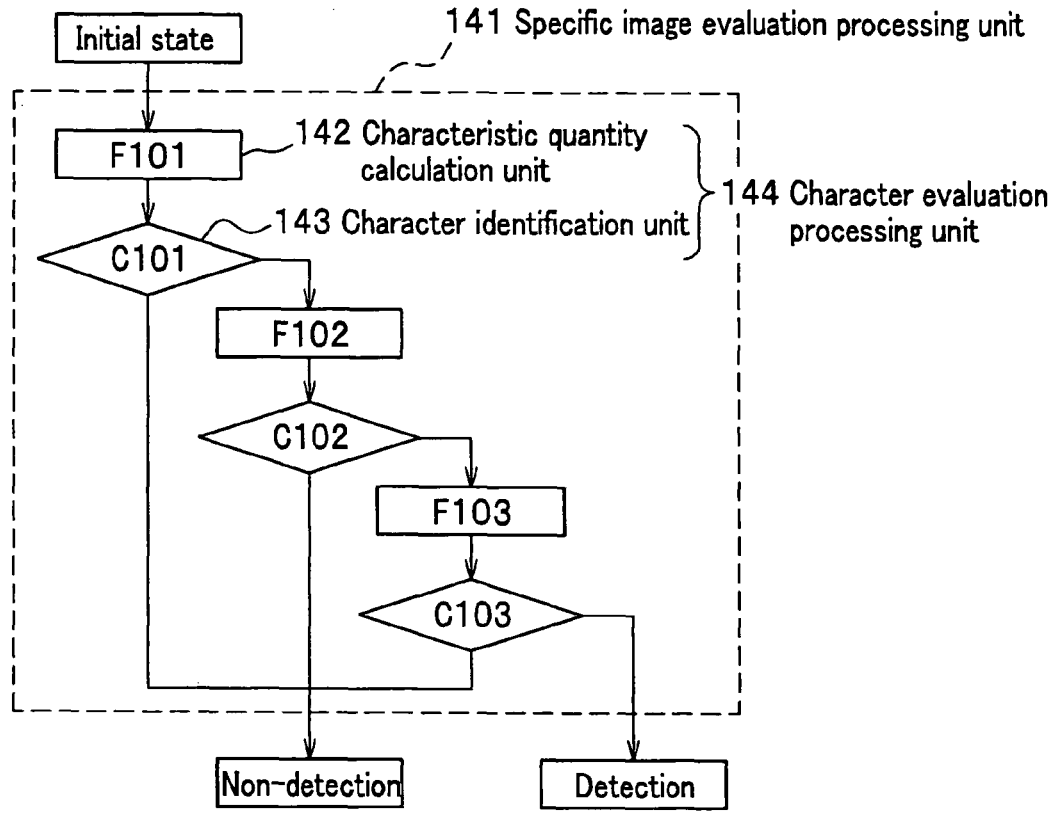
FIG. 7 is a flowchart showing an example of a flow of a specific image detection processing according to the first embodiment.
Figure 8:
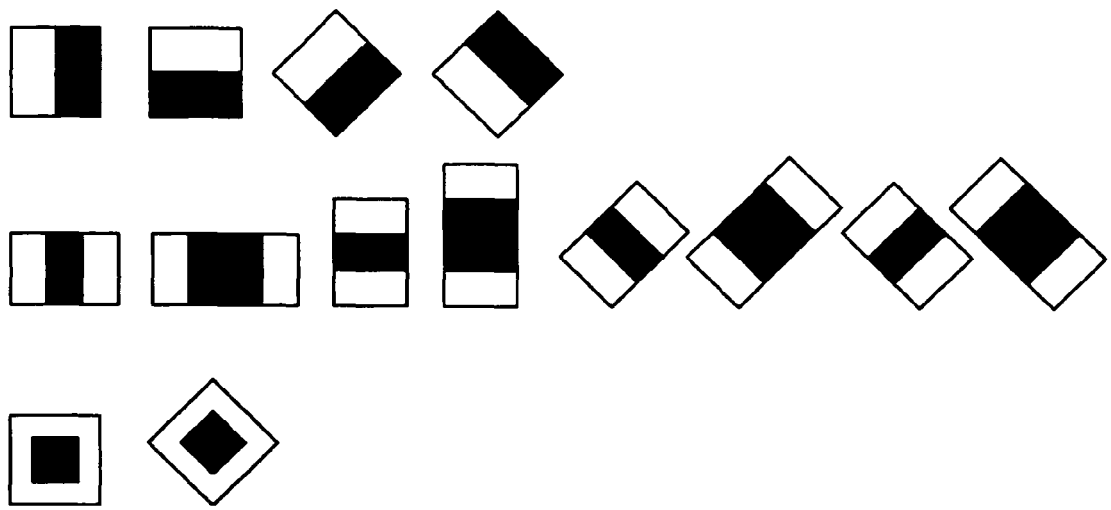
FIG. 8 is an illustration showing an example of Haar-Wavelet-like bases used for a character extracting of an image according to the first embodiment.

Next, the specific image detection processing shown in FIG. 3 will be explained in detail by referring to FIGS. 7 and 8. Here, FIG. 7 is a flowchart showing an example of a flow of the specific image detection processing according to the first embodiment of the present invention. FIG. 8 is an illustration showing an example of Haar-Wavelet-Like bases to be used for extracting an image.

As shown in FIG. 7, the specific image detection processing according to the embodiment is configured to include a specific image evaluation processing unit 141 which is formed by multiple stacking of unit processing composed of a characteristic quantity calculation unit 142 and a character identification unit 143. Hereinafter, the unit processing composed of the characteristic quantity calculation unit 142 and the character identification unit 143 is called as a character evaluation processing unit 144. Therefore, in the case of FIG. 7, the character evaluation processing unit 144 at a first step is composed of F101 and C101, that of a second step is composed of F102 and C102, and that of a third step is composed of F103 and C103. That is, in the case of FIG. 7, a specific image is detected by executing the character evaluation processing three times. Meanwhile, in FIG. 7, a stacking number of the unit processing in the character evaluation processing unit 144 is three steps, however, any number of the step no less than one is available.

The characteristic quantity calculation unit 142 calculates a characteristic quantity Fj which is formulated by formula 1.

$$F_j = \sum_i \left( \alpha_{j,i} \sum_{(x,y) \subset S_{i,white}} I_{x,y} - \sum_{(x,y) \subset S_{i,black}} I_{x,y} \right) \quad \text{(formula 1)}$$

In the formula 1, j is an identification number of the characteristic quantity calculation unit 142 (that is, the character evaluation processing unit 144). When the character evaluation processing unit 144 is stacked as shown in FIG. 7, an order of the character evaluation processing unit 144 from the top thereof may be assigned to the identification number. In addition, "Si,white" and "Si,black" indicate a white area and a black area respectively in the Haar-Wavelet-Like bases (refer to FIG. 8) with an identification number i. $\alpha_{j,i}$ is a parameter indicating a character of a specific image for the Haar-Wavelet-Like bases with the identification number i in the characteristic quantity calculation unit 142 with the identification number j. Also, $I_{x,y}$ indicates a luminance value at coordinates (x, y) in a detection target area.

Meanwhile, the Haar-Wavelet-Like bases are, as shown in FIG. 8, for example, fourteen graphical primitive images composed of a white area and a black area, and used for expressing a character of a specific image of an extraction target such as a human face. Here, the identification number i (i=1, 2, ..., 14) is labeled to each Haar-Wavelet-Like bases in FIG. 8. Meanwhile, a detailed explanation on the Haar-Wavelet-Like bases is described in the third non-patent literature.

In the embodiment, it is assumed that a specific image to be extracted is characterized by a set of parameters (αj,1, αj,2, ..., αj,14) based on the Haar-Wavelet-Like bases. In this case, for expressing a character of a specific image having vagueness such as a human face, a plurality of sets of parameters (αj,1, αj,2, ..., αj,14) (j=1, 2, ..., N) are required in general, and each set of parameters corresponds to each characteristic quantity calculation units 142 in FIG. 7. Here, N is a set number of parameters, or a characteristic quantity calculation unit 142 number included in the specific image evaluation processing unit 141.

Next, the character identification unit 143 calculates formula 2, and based on the result, checks whether or not an image in a detection target area has a character identical to that of a specific image.

$$\text{Object} = \begin{cases} 1: & (F_j \geq \theta_j) \\ 0: & (F_j < \theta_j) \end{cases} \quad \text{(formula 2)}$$

Here, θj is a threshold value set in advance in the character identification unit 143 which forms a pair together with the characteristic quantity calculation unit 142 with identification number j. According to the formula 2, a value of the "Object" becomes 1 when the characteristic quantity Fj, which is calculated by the characteristic quantity calculation unit 142, is no less than the threshold value θj, and when less than the θj, the "Object" becomes 0 (zero). When the "Object" is 1, the character identification unit 143 determines that the image in the detection target area has the identical character. On the other hand, when the "Object" becomes 0 (zero), the character identification unit 143 determines that the image in the detection target area does not have the identical character, that is, the character identification unit 143 determines that the image is not the specific image to be detected.

As described above, the character evaluation processing unit 144 (characteristic quantity calculation unit 142 and character identification unit 143) checks whether or not an image in a detection target area has a character identical to that of a specific image, by using the set of parameters (αj,1, αj,2, . . . , αj,14) which expresses a character of a specific image corresponding to the character evaluation processing unit 144, and the threshold value θj (j=1, 2, . . . ). In FIG. 7, arrows leaded out to right sides from rhombic blocks (C101, C102, C103) of the character identification unit 143 indicate that an image in the detection target area is determined to have a character identical to that of a specific image, and arrows lead out downward indicate that the image in the detection target area does not have a character identical to that of the specific image.

That is, when all character evaluation processing units 144 included in the specific image evaluation processing unit 141 determine that, namely, when all character identification units 143 (C101, C102, C103) determine that "the image in the detection target area has a character identical to that of the specific image", the specific image evaluation processing unit 141 determines that "the specific image is detected". In addition, when any one of the character identification units 143 (C101, C102, C103) determine that "the image in the detection target area does not have a character identical to that of the specific image", the specific image evaluation processing unit 141 determines that "the specific image is not detected".

From the above, when the specific image evaluation processing unit 141 determines that "the specific image is detected", the specific image extraction unit 14 extracts the image in the detection target area as an extraction specific image, stores the extracted extraction specific image in the image storage unit 12, and ends processing of the specific image evaluation processing unit 141. On the other hand, when the specific image evaluation processing unit 141 determines that "the specific image is not detected", the specific image extraction unit 14 directly ends the processing of the specific image evaluation processing unit 141.

Meanwhile, the set of parameters (αj,1, αj,2, . . . , αj,14) and the threshold value θj (j=1, 2, . . . , N) which are used in the above processing are calculated in advance before executing processing of the specific image evaluation processing unit 141, by using, for example, a predetermined learning program and teacher data, and the calculated values are stored in the specific image characteristic parameter storage unit 13.

Subsequently, the display image generation unit 15 (refer FIG. 1) displays the specific image 33, which is extracted through the above-described manner and stored in the image storage unit 12, on the display 3 as a display image as shown in FIG. 2, together with the shrunk whole image 32.

As described above, according to the first embodiment of the present invention, for example, by automatically extracting a specific image such as a human face by using a computer from an input image input through the monitoring camera 2 for, for example, monitoring or the like, the extracted extraction specific image such as a human face is displayed around a shrunk whole image of the input image without lowering the resolution. Therefore, from the displayed specific image such as a human face, for example, the characteristics and expressions of the specific image can be obtained. In addition, a movement of the specific image such as a human face which has a certain character, that is, a flow line of the specific image can be obtained within a whole monitoring image.

Second Embodiment

Hereinafter, a second embodiment of the present invention will be explained by referring to FIGS. 9 to 12.

Figure 9:
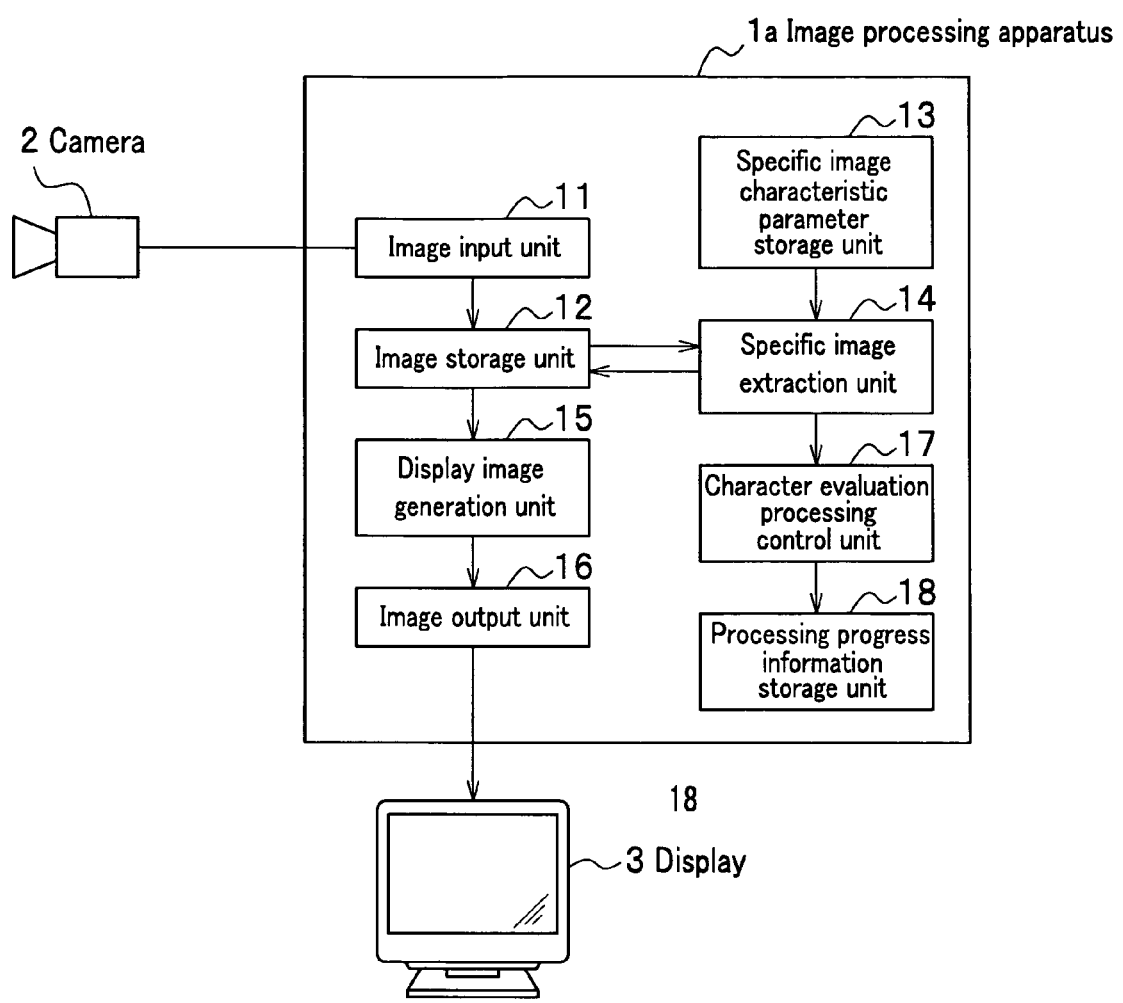
FIG. 9 is an illustration showing an example of a configuration of an image processing apparatus according to the second embodiment of the present invention.

FIG. 9 is an illustration showing an example of a configuration of an image processing apparatus according to a second embodiment of the present invention. As shown in FIG. 9, an image processing apparatus 1a according to the second embodiment has a configuration where a character evaluation processing control unit 17 and a processing progress information storage unit 18 are added to the configuration of the image processing apparatus 1 (refer to FIG. 1) according to the first embodiment. That is, the second embodiment has a configuration identical to that of the first embodiment except the character evaluation processing control unit 17 and the processing progress information storage unit 18. Then, in the second embodiment, a same symbol is labeled to a component identical to that of the first embodiment, and an explanation thereof will be omitted.

The character evaluation processing control unit 17 controls a processing quantity of the specific image evaluation processing unit 141 (refer to FIG. 7) in the specific image extraction unit 14. In addition, the processing progress information storage unit 18 stores progress information of processing when the processing is interrupted by the character evaluation processing control unit 17 for controlling the processing quantity of the specific image evaluation processing unit 141.

In the embodiment, a monitoring image is input from the monitoring camera 2 in real time with a predetermined interval, and a predetermined specific image is extracted from the input image. Then, extraction processing of the specific image is required to be completed within a predetermined time. However, when the character evaluation processing unit 144, which is composed of the character calculation unit 142 and the character identification unit 143, is multiply stacked in the specific image evaluation processing unit 141, in addition, when many specific images of extraction targets exist in the input image, a long time is required for extracting the specific images. As a result, extractions of the specific images for all areas of the input image can not be completed within the predetermined time in some case. Then, by reducing the processing quantity of the specific image evaluation processing unit 141 in the specific image extraction unit 14, the character evaluation processing control unit 17 eliminates the above issue that the extractions of the specific images for all areas of the input image can not be completed. Herein below, the details will be explained.

As explained in the first embodiment, the specific image evaluation processing unit 141 reads out a set of parameters ($\alpha j,1, \alpha j,2, \ldots, \alpha j,14$) characterizing a specific image to be extracted and its threshold value $\theta j$ from the specific image characteristic parameter storage unit 13, and determines whether the specific image is detected (Detection) or not detected (Non-detection), by operating each character evaluation processing unit 144 corresponding to each parameter by each set of parameters.

Here, a point to notice is that each character evaluation processing unit 144 corresponding to each set of parameters has a different detection capability and different processing time of the specific image to each other. In addition, in the first embodiment, whether the specific image is detected (Detection) or not detected (Non-detection) is determined after operating all character evaluation processing units 144 stacked in the specific image evaluation processing unit 141. However, in the second embodiment, whether the specific image is detected or not detected is determined based on a determination result of an executed character evaluation processing unit 144 without operating all the stacked character evaluation processing units 144. In this case, the issue is not to become unable to detect a specific image, but lowering of a detection capability of the specific image.

Therefore, the character evaluation processing control unit 17 evaluates a processing time and detection capability of the character evaluation processing units 144 in the specific image evaluation processing unit 141, and based on the evaluation, determines a priority and processing number of the processing so that a specific image can be detected efficiently within a predetermined limit time.

In addition, the character evaluation processing control unit 17 implements a progress management of the character evaluation processing units 144 in the specific image extraction processing. In the progress management, when the predetermined limit time has elapsed before every processing of the character evaluation processing units 144 in the specific image evaluation processing unit 141 is completed, whether a specific image is detected or not detected is determined based on evaluation results implemented by the character evaluation processing units 144 before the predetermined limit time has elapsed. In addition, further, the progress information (information of, for example, processing completed/unprocessed) of the character evaluation processing units 144 in the specific image evaluation processing unit 141 is stored in the processing progress information storage unit 18. On the other hand, when the processing of the character evaluation processing units 144 in the specific image evaluation processing unit 141 is completed and if a time remains until the predetermined limit time elapses, unprocessed processing of the character evaluation processing units 144 stored in the processing progress information storage unit 18 is executed.

Figures 10, 11:
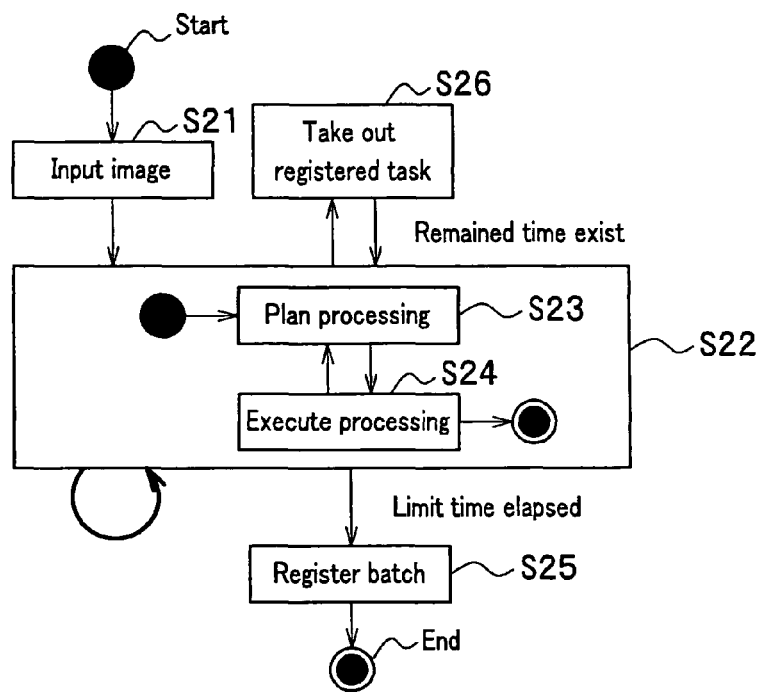
FIG. 10 is an illustration showing an example of a state transition diagram of specific image extraction processing in the image processing apparatus according to the second embodiment.
FIG. 11 is an illustration showing an example of a configuration of a batch processing table according to the second embodiment.

FIG. 10 is an illustration showing an example of a state transition of specific image extraction processing in an image processing apparatus according to the second embodiment. In FIG. 10, a black circle indicates a starting state, and a double black circle indicates an ending state. First, the image processing apparatus 1a transits to an image input state (S21) triggered by an input signal from the monitoring camera 2, and the image input unit 11 inputs image data input from the monitoring camera 2 and stores the input image data in the image storage unit 12.

If storage of the input image data in the image storage unit 12 is completed, the image processing apparatus 1a transits to an image processing state (S22). In the image processing state (S22), the image processing apparatus 1a alternately transits between a processing plan state (S23) and a processing execution state (S24) after every processing completion of the each state until predetermined specific image extraction processing for the input image is completed, or the predetermined limit time elapses.

The character evaluation processing control unit 17 of the image processing apparatus 1a evaluates a processing time and a detection capability of a specific image with respect to each character evaluation processing units 144 in the specific image evaluation processing unit 141, as the processing of the processing plan state (S23), and plans, for example, which processing of the character evaluation processing units 144 should be preferentially executed. In addition, the specific image extraction unit 14 executes predetermined processing of the specific image evaluation processing unit 141, based on an execution plan of processing planned at the processing plan state (S23), as the processing of the processing execution state (S23). Meanwhile, a processing content of the processing plan state (S23) will be described later.

When the predetermined limit time has elapsed, the specific image extraction unit 14 ends processing of the specific image evaluation processing unit 141 even if it is before completion of processing of the processing execution state (S24), and transits to a batch registration state (S25) Then, in the batch registration state (S25), progress information of the processing is registered in a batch processing table (refer to FIG. 11) so that unprocessed processing of the specific image evaluation processing unit 141 can be restarted later, and the predetermined processing of the specific image evaluation processing unit 141 for an image of the detection target area is ended.

FIG. 11 is an illustration showing an example of a configuration of a batch processing table according to the second embodiment. In FIG. 11, an image data number is a number for identifying image data of a detection target area. In addition, in the batch processing table, information such as a completed processing content, a remaining processing content, and an estimated time for completing processing, of the specific image evaluation processing unit 141 for the image data is stored so as to correspond to the image data number.

Here, the explanation returns to FIG. 10. When the predetermined processing is completed at the processing execution state (S24), that is, when every processing of the specific image evaluation processing unit 141 planned at the processing plan state (S23) is completed, if time remains before the predetermined limit time elapses, the image processing apparatus 1a transits to a registered task fetch state (S26). In the registered task fetch state (S26), the image processing apparatus 1a, that is, the specific image extraction unit 14 fetches one of registered batch processing tasks from the batch processing table of the processing progress information storage unit 18, and transits to the processing execution state (S22). Then, in the processing execution state (S22), the fetched registered batch task is executed as with the processing for the input image.

Figure 12:
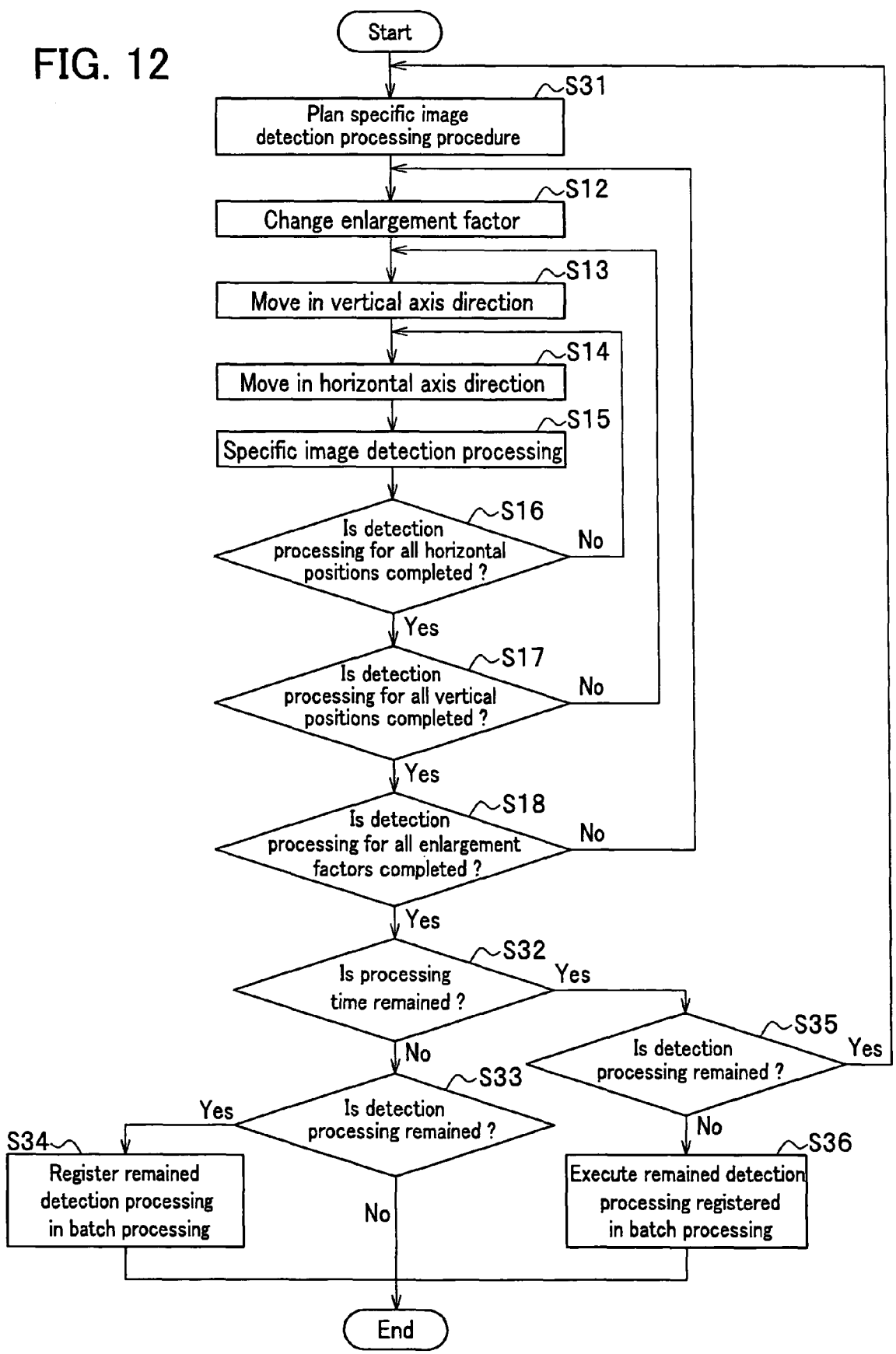
FIG. 12 is a flowchart showing an example of a flow of the specific image extraction processing according to the second embodiment.

FIG. 12 is a flowchart showing an example of a flow of specific image extraction processing according to the second embodiment. As shown in FIG. 12, when an image is input from the monitoring camera 2, the image processing apparatus 1a plans a procedure of specific image extraction processing (step S31), for example, for determining a priority (order of processing) and processing number of processing of the character evaluation processing units 144, based on, for example, a processing time, a specific image detection capability, and time allowable for processing each character evaluation processing units 144 in the specific image evaluation processing unit 141 (refer to FIG. 7).

Hereinafter, since processing of steps S13 to S18 is the same with that of shown in FIG. 3, the explanation will be omitted. However, in the embodiment, all character evaluation processing units 144 included in the specific image evaluation processing unit 141 are not executed in the specific image detection processing at the step S15, but executed according to a processing procedure planned at the step S31.

If the predetermined detection processing planned at the step S31 is completed for every areas of an input image by the step S18, the character evaluation processing control unit 17 checks whether or not there remains a processing time with respect to the predetermined limit time (step S32). As a result of the check, if there remains the processing time (step S32: Yes), whether or not every processing of the character evaluation processing units 144 included in the specific image evaluation processing unit 141 is completed, that is, whether or not there remains detection processing, is checked (step S35). As a result of the above check, if there remains the detection processing (character evaluation processing units 144, same in below) to be executed in the specific image evaluation processing unit 141 (step S35: Yes), the step returns to the step S31, and the steps after the step S12 are executed by planning the detection procedure again for the remaining detection processing.

In addition, in the check at the step S35, if there remains no detection processing to be executed in the specific image evaluation processing unit 141 (step S35: No), processing which is determined as remaining detection processing (unprocessed) of the character evaluation processing units 144, that is, detection processing registered as a batch processing task in the batch processing table (refer to FIG. 11), is taken out from the batch processing table, and executed (step S36).

In addition, in the check at the step S32, when there remains no processing time (step S32: No), whether or not every detection processing of the specific image evaluation processing unit 141 is executed, that is, whether or not there remains detection processing (step S33) is checked. As a result of the check, if there remains detection processing to be executed in the specific image evaluation processing unit 141 (step S33: Yes), the remaining detection processing is registered in the batch processing table as a batch processing task (step S34), and extraction processing of a specific image is ended. In addition, if there remains no detection processing to be executed in the specific image evaluation processing unit 141 (step S33: No), the extraction processing of the specific image is directly ended.

At the step S15 explained in the above, if an image in the detection target area is determined to have identical characters with that of a specific image in all checking results (character identification unit 143) of the detection processing planed at the step S31, it is determined that the specific image is detected, and the image in the detection target area is stored in the image storage unit 12 as an extraction specific image. However, when the image in the detection target area is determined not to be the specific image in the subsequent processing, the image in the detection target area once stored in the image storage unit 12 is deleted.

Next, processing (step S31 in FIG. 12) in the processing plan state (S23 in FIG. 10) will be explained. In processing of the processing plan, a processing time and detection capability of the character evaluation processing unit 144 are evaluated in advance.

When the Haar-Wavelet-Like bases (refer to FIG. 8) are applied to a characteristic quantity calculation, a processing time of the character calculation unit 142 becomes long in proportion to an image size of the bases, that is, a memory access time. Also, if the base number increases, the processing time becomes long. Therefore, the processing time can be estimated from the size and a base number. Further, since only an area where a specific image is not detected in an input image becomes a target area for the specific image detection processing, the processing time also becomes long in proportional to a size of this area.

Accordingly, an estimated processing time Tj of the character evaluation processing unit 144 with an identification number j is expressed in formula 3.

$$T_j = R_j \left( w_{j,1} \cdot \sum_{i=1}^{b_j} s_{j,i} + w_{j,2} \cdot b_j \right) \quad \text{(formula 3)}$$

In the formula 3, $s_{j,i}$ is a pixel number relating to a base, which is included in the characteristic quantity calculation unit 142, with an identification number i, $b_j$ is a base number which is included in the characteristic quantity calculation unit 142 with an identification number j, Rj is an area of an image of a detection target, and wj,1, wj,2 are proportionality coefficients.

In addition, a detection capability Aj of a specific image of the unit processing composed of the j-th characteristic quantity calculation unit 142 and character identification unit 143 is, for example, defined by formula 4.

$$A_j = \frac{\text{(detected\_number\_by\_character\_identification\_unit/correct\_non-detected\_number)}}{\text{(teacher\_image\_data\_number\_input\_in\_characteristic\_quantity\_calculation\_unit)}} \quad \text{(formula 4)}$$

Meanwhile, the detection capability Aj can be learnt together when parameters ($\alpha j1, \alpha j,2, \ldots, \alpha j,14$) and a threshold value $\theta j$ (j=1, 2, ...) corresponding to the parameters are learnt from a predetermined teacher data.

Further, in processing for planning the detection processing (step S31 in FIG. 12), unit processing of the detection processing which has a superior detection efficiency of a specific image is preferentially selected and executed by trading off the estimated processing time Tj and detection capability Aj. The unit processing of detection processing for preferential processing is selected based on formula 5.

$$\arg\min_j(T_j + \alpha/A_j) \quad \text{(formula 5)}$$

In formula 5, j is an identification number for identifying unit processing composed of the characteristic quantity calculation unit 142 and character identification unit 143 (j=1, 2, ..., N: N is a unit processing number included in the specific image evaluation processing 141). Also, $\alpha$ is a weighting coefficient for determining tradeoff between a processing time and a detection capability, and a function "arg min" is a function for calculating j with which a value of formula within the case arc becomes minimum.

Meanwhile, processing for planning detection processing is not limited to use the formula 5, but various kinds of modifications of the formula 5 are possible. For example, in consideration of a predetermined limit time in advance, a plan for increasing a response may be available by selecting unit processing having a superior detection capability in the first half of the limit time even if a long time is required for the processing, and selecting unit processing having a short processing time in the second half of the limit time. The above can be achieved, as shown in formula 7, by defining that the weighting coefficient $\alpha$ in the formula 5 varies depending on an elapsed time t within the limit time T. In this case, the formula 5 is expressed with formula 6.

$$\mathrm{argmin}_j(T_j + \alpha(t)/A_j) \qquad \text{(formula 6)}$$

$$\alpha(t) = \begin{cases} 1: & \left(\text{if: } t \le \frac{3}{4}T\right) \\ 10: & \left(\text{if: } t > \frac{3}{4}T\right) \end{cases} \qquad \text{(formula 7)}$$

As described above, according to the second embodiment, the image processing apparatus 1a plans a processing procedure for specific image extraction processing in consideration of a predetermined limit time in advance, and based on the processing procedure, further executes extraction processing of a specific image, while implementing a progress management of the detection processing. Therefore, for example, a following disadvantage never happens that an extraction image of a specific image can not be obtained due to shortage of time. Accordingly, for example, when an image from the monitoring camera 2 is monitored in real time, frame dropping of an extraction image of a specific image never happens even if the limit time of the specific image extraction processing is short.

In addition, extraction processing of a specific image which has not been executed due to shortage of time is executed when there is a remaining time squeezed out through processing of other input image. That is, when a monitoring image is used in off-line, for example, for verifying a crime, extraction of the specific image can be executed for all detection conditions (set of parameters characterizing a specific image) set at the beginning. Therefore, in this case, a monitoring image displaying a specific image extracted under the best detection condition can be provided.

Third Embodiment

Hereinafter, a third embodiment of the present invention will be explained by referring to FIG. 13.

Figure 13:
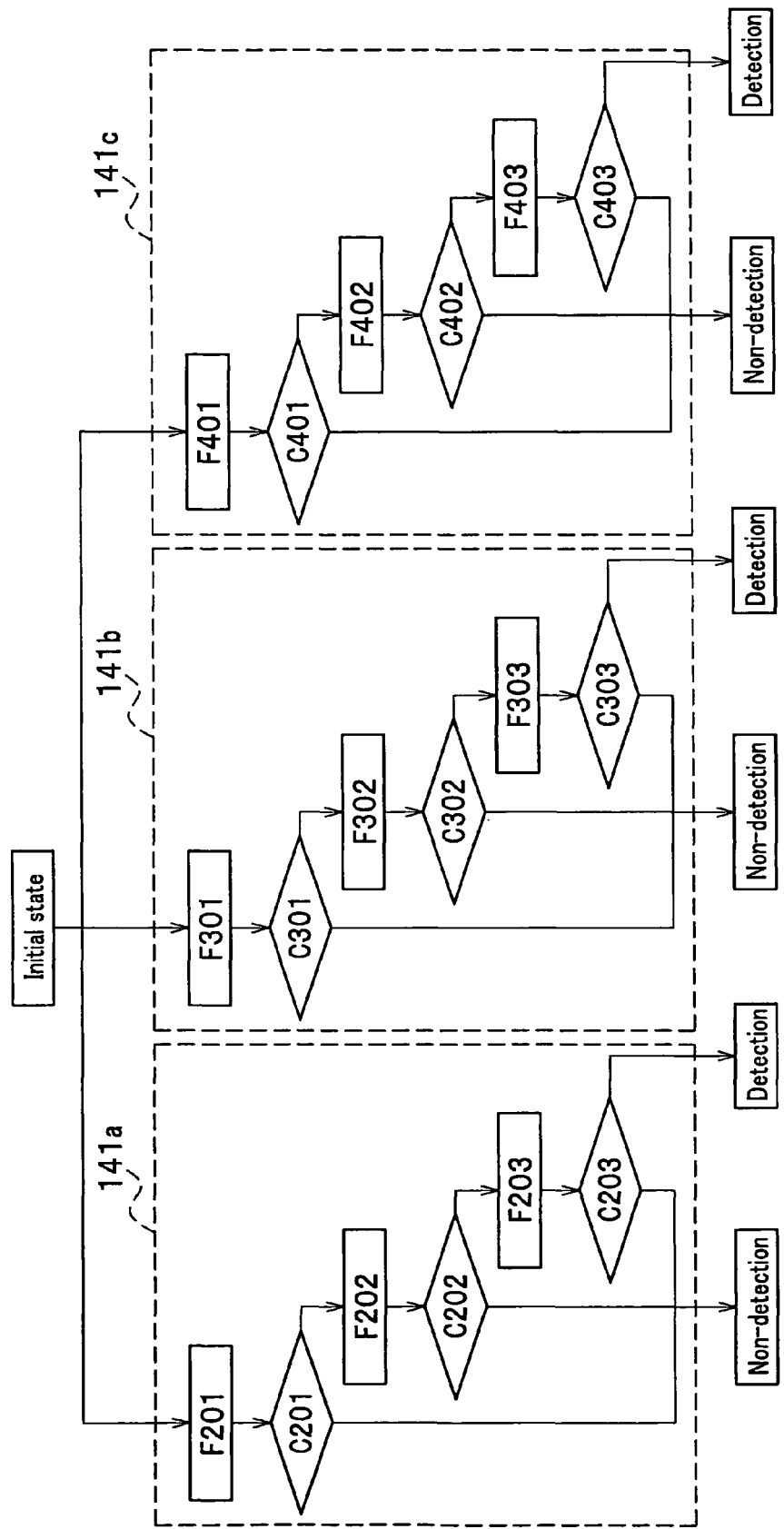
FIG. 13 is an illustration showing an example of a flow of specific image extraction processing according to the third embodiment of the present embodiment.

FIG. 13 is an illustration showing an example of a flow of specific image detection processing according to a third embodiment of the present invention. In the embodiment, a plurality (in the example, three) of specific image evaluation processing units which are identical to the specific image evaluation processing unit 141 shown in FIG. 7 are disposed. In each of the specific image evaluation processing units 141a, 141b, and 141c, a different specific image is detected respectively. For example, when a human face is detected, each of the specific image evaluation processing units 141a, 141b, and 141c detects independently a full-faced human face, a diagonally forward-faced human face, and a side-faced human face, respectively.

In FIG. 13, processing within the each specific image evaluation processing units 141a, 141b, and 141c is executed with a similar manner to that of the specific image evaluation processing unit 141 shown in FIG. 7. In addition, in FIG. 13, when a first specific image (for example, a full-faced human face) is detected by executing the specific image evaluation processing units 141a, an image of a detection target area at the time is stored in the image storage unit 12, and when the first specific image is not detected, the specific image evaluation processing units 141b detects a second specific image (for example, a diagonally forward-faced human face). If the second specific image is detected, an image of a detection target area at the time is stored in the image storage unit 12. As with a manner described above, a third specific image (for example, a side-faced human face) is detected.

Meanwhile, in each character evaluation processing unit 144 of the specific image evaluation processing units 141a, 141b, and 141c, a set of parameters ($\alpha j,1, \alpha j,2, \ldots, \alpha j,14$) indicating a character of a specific image and a threshold value $\theta j$ (j=1, 2, ..., N) corresponding to the set of parameters are set. Values of these parameters are calculated in advance by, for example, a predetermined program and teacher data, and the calculated values are stored in the specific image characteristic parameter storage unit 13.

In addition, in FIG. 13, by further adding a character evaluation processing unit similar to the specific image evaluation processing units 141a, 141b, and 141c, a male face, a female face, a child face, and the like may be detected by each added character evaluation processing unit. Further, for example, an age level, a hair style, a skin color, a hair color, a head shape, with or without glasses, with or without mask, with or without accessories, with or without lentigo, a whisker shape, and a whisker color may be detected by configuring as with the above.

Meanwhile, when a human face is detected by differentiating an age level, a hair style, a skin color, a hair color, a head shape, with or without glass, with or without mask, with or without accessories, with or without lentigo, a whisker shape, and a whisker color, all specific image evaluation processing units are not executed in parallel, but processing for detecting a human face is executed once, and only when a human face is detected, an age level, a hair style, a skin color, a hair color, a head shape, with or without glass, with or without mask, with or without accessories, with or without lentigo, a whisker shape, and a whisker color may be detected. In this case, a configuration of a flow of specific image detection processing includes a configuration stacked in series, as well as parallel configuration of the specific image evaluation processing units (141a, 141b, 141c) as shown in FIG. 13.

In addition, as a modified configuration of the third embodiment, a configuration where each specific image evaluation processing units 141a, 141b, and 141c is executed by each independent computer may be available. In this case, in the image processing apparatus 1 in FIG. 1, a processing distribution control unit for distributing specific image extraction processing is arranged at a position of the specific image extraction unit 14, and a plurality of computers are arranged under the processing distribution control unit and each specific image evaluation processing units 141a, 141b, and 141c of the specific image extraction unit 14 is arranged to each computer. In this case, a body of the image processing apparatus 1 including the processing distribution control unit and the plurality of computers under the processing distribution control unit are connected with a network, for example, a private line or LAN (Local Area Network). In this configuration, since the extraction processing of the specific image is executed simultaneously by the plurality of computers, a processing time for the extraction processing can be substantially shortened.

Fourth Embodiment

Figure 14:
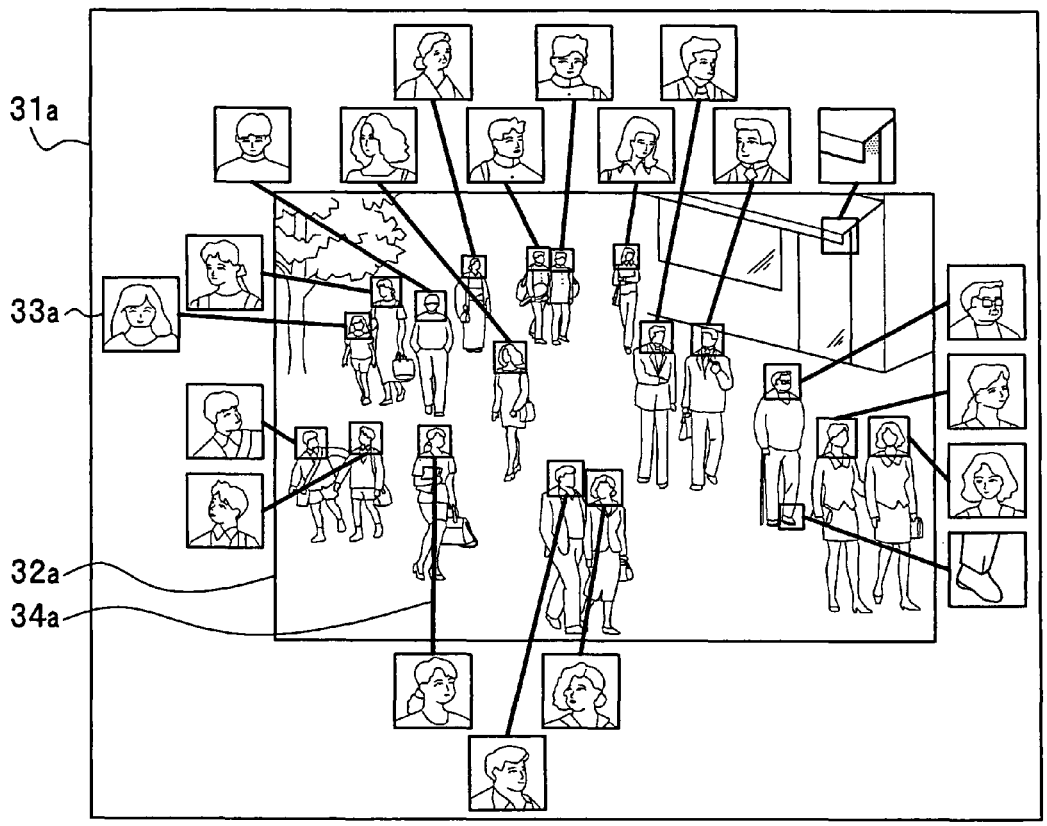
FIG. 14 is an illustration showing an example of a display image displayed on a display by an image processing apparatus according to the fourth embodiment of the present invention.
Figure 15:
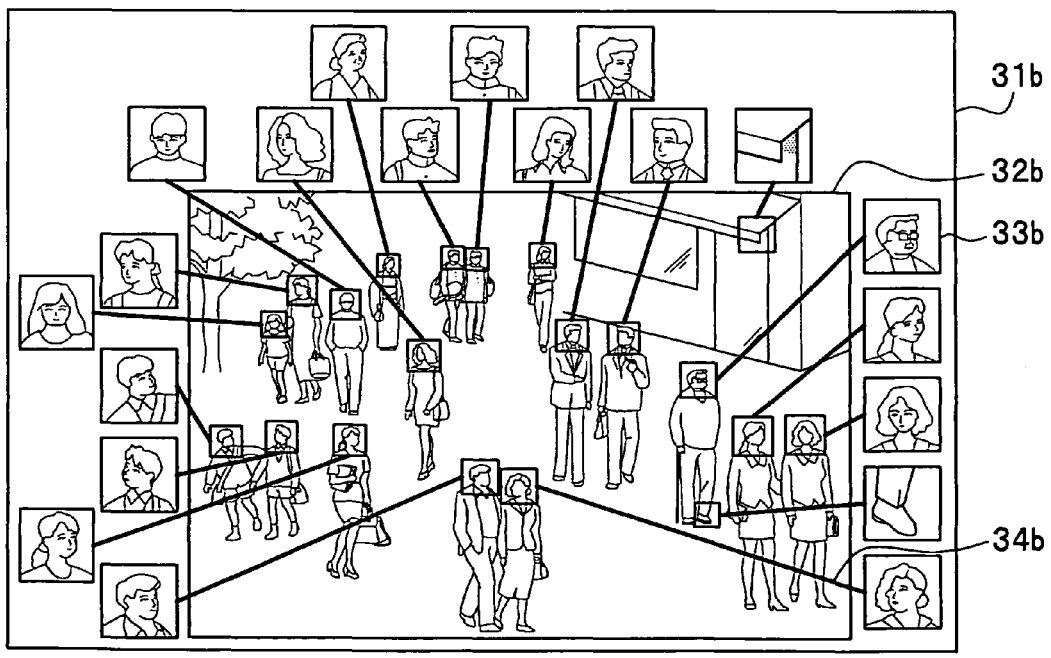
FIG. 15 is an illustration showing an example of a modified display image displayed on the display by the image processing apparatus according to the fourth embodiment.
Figure 16:
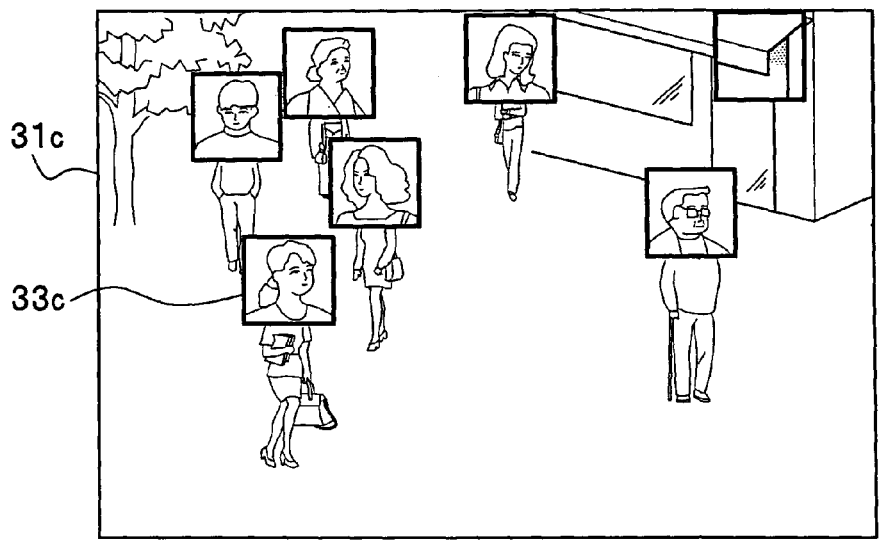
FIG. 16 is an illustration showing an example of a second modified display image displayed on the display by the image processing apparatus according to the fourth embodiment.
Figure 17:
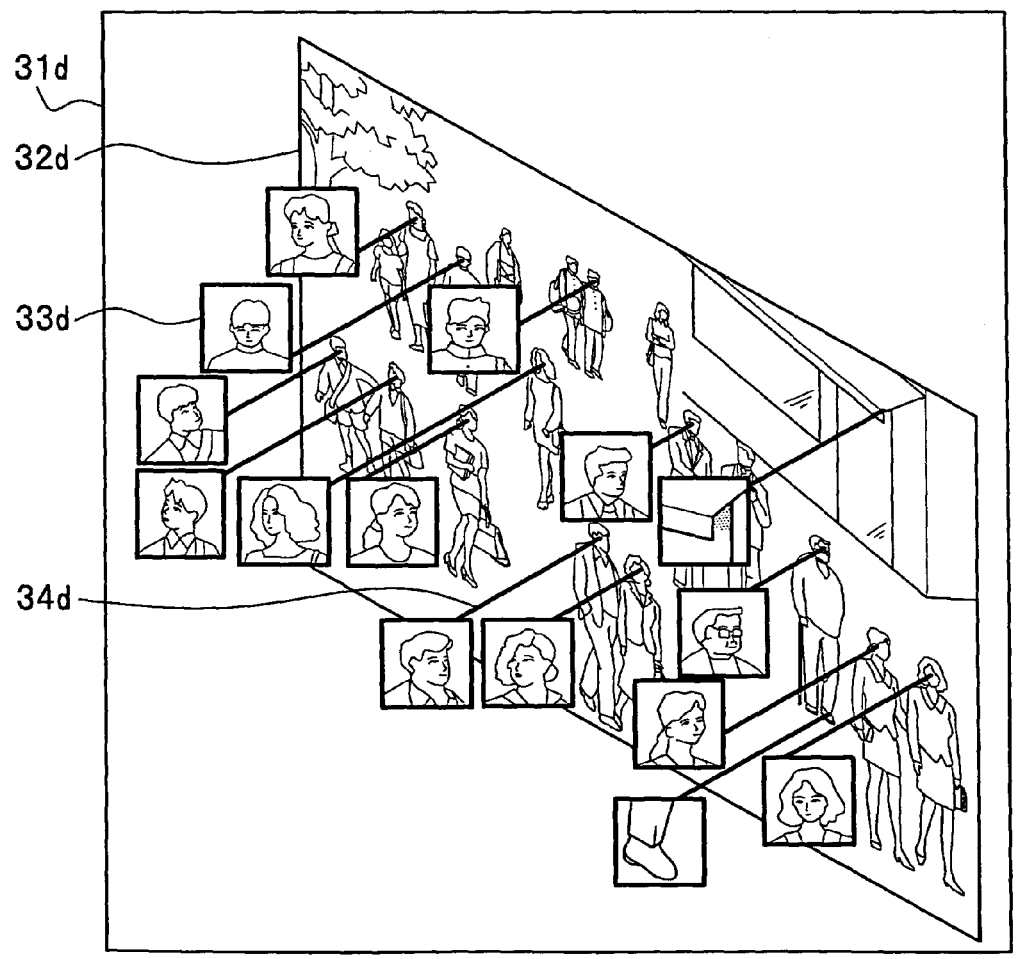
FIG. 17 is an illustration showing an example of a third modified display image displayed on the display by the image processing apparatus according to the fourth embodiment.

Subsequently, as a fourth embodiment of the present invention, an example of a display image displayed on the display 3 by the image processing apparatuses 1, 1a described in the first to third embodiments will be shown by referring FIGS. 14 to 17. Here, FIG. 14 is an illustration showing an example of a display image displayed on a display by an image processing apparatus according to a fourth embodiment of the present invention. Also, FIG. 15 is a modified example of the display image example in FIG. 14, FIG. 16 is a second modified example of the display image example in FIG. 14, and FIG. 17 is a third modified example of the display image example in FIG. 14, respectively.

Meanwhile, a configuration of the present embodiment is identical to that of, for example, the first embodiment except the display image generation unit 15 (refer to FIGS. 1, 9). In addition, a display image generation function for displaying the shrunk whole image 32 as a whole image by lowering a resolution of a monitoring image by the display image generation unit 15 and for displaying the specific image 33 extracted by the specific image extraction unit 14 without lowering the resolution is identical to that of the first embodiment.

In the example of the display image 31 shown in FIG. 2, the specific image 33 extracted by the specific image extraction unit 14 is arranged at outside of four sides of the shrunk whole image 32. In that case, there is a possibility that the lead lines 34 may cross to each other and may pass a specific image detection part (a human face part) of the shrunk whole image 32. If the lead lines 34 cross to each other, or pass another specific image detection part, the display image 31 becomes difficult to see clearly.

Therefore, in this embodiment (a part except the display image generation unit 15 is the same with that of any one of embodiments according to the embodiments 1 to 3), the display image generation unit 15 generates, as shown in FIG. 14, the display image 31a so that a plurality of rows of extracted specific images 33a can be arranged around a periphery of each four sides of the shrunk whole image 32a. In this case, since a freedom of arrangement of the extracted specific images 33a is increased, the possibility that the lead lines 34 cross to each other, or pass another specific image detection part (a human face) can be reduced.

In addition, as shown in FIG. 15, the display image generation unit 15 may arrange the extracted specific images 33a, for example, around a periphery of three sides of the shrunk whole image 32b except the bottom side, instead of arranging around a periphery of all four sides.

In addition, as shown in FIG. 16, the display image generation unit 15 displays a shrunk whole image on a full frame of the display image 31c, and generates a display image where the extracted specific image 33c is arranged at a specific image detection part of the shrunk whole image. In this case, since a lead line is unnecessary, the display image becomes clear.

In addition, as shown in FIG. 17, the display image generation unit 15 may generates a display image 31d, where the shrunk whole image 32b is displayed such that the image 32b is projected on a screen configured to face diagonally forward, for example, a lead line 34d is leaded out toward a direction perpendicular to the screen from a detection part of a specific image displayed on the screen, and an extracted specific image 33d is displayed at the end of the lead line. In this case, since the extracted specific image 33d and the shrunk whole image 32d are apparently seen on a different plane in three dimensions, respectively, the extracted specific image 33d and the shrunk whole image 32d can be separated easily.

In all embodiments described above, the extracted specific image 33d and the shrunk whole image 32d are displayed on the same display 3. However, the extracted specific image 33d and the shrunk whole image 32d may be displayed on a different display 3, respectively.

What is claimed is:

1. An image processing apparatus connected to a monitoring camera and a display for processing an image input from the monitoring camera, comprising:

an image storage unit for storing an image including an input image input from the monitoring camera;

a characteristic parameter storage unit for storing a characteristic parameter characterizing a specific image extracted from the input image;

a specific image extraction unit, wherein the specific image extraction unit cuts out images having a plurality of predetermined sizes from all parts of the input image stored in the image storage unit, executes character evaluation processing for checking whether or not cut out images have an identical character to the specific image characterized by the characteristic parameter for each cut out image, and extracts the cut out images which are determined to have an identical character to the specific image by the character evaluation processing as an extraction specific image; and a display image generation unit for generating a display image for displaying a whole image of the input image and the extraction specific image on the display, wherein the characteristic parameter storage unit stores a plurality of sets of the characteristic parameter, wherein the specific image extraction unit executes the character evaluation processing for each of the plurality of sets of the characteristic parameter stored in the characteristic parameter storage unit, and when the cut out image is determined to have identical character to the specific image in every executed character evaluation processing, extracts the cut out image as the extraction specific image, wherein the image processing apparatus further comprises
a character evaluation processing control unit for setting a priority of the processing in regard to the character evaluation processing for the plurality of sets of the characteristic parameter, wherein the specific image extraction unit executes the character evaluation processing for the plurality of sets of the characteristic parameter based on the priority set by the character evaluation processing control unit, a processing progress information storage unit for storing processing progress information of the character evaluation processing, wherein the character evaluation processing control unit stores identification information of the characteristic parameter indicating that the character evaluation processing is not processed in the processing progress information storage unit when the predetermined limit time elapses before the specific image extraction unit completes the character evaluation processing for all the plurality of sets of the characteristic parameter and the extraction specific image is extracted, reads out the identification information of the characteristic parameter indicating that the character evaluation processing is not processed from the processing progress information storage unit when the predetermined limit time remains after the specific image extraction unit completes the character evaluation processing for all the plurality of sets of the characteristic parameter, and makes the specific image extraction unit execute the character evaluation processing for the characteristic parameter identified by read out identification information.

2. The image processing apparatus according to claim 1, wherein when a predetermined limit time, which is set in advance, elapses before completing the character evaluation processing for all the plurality of sets of the characteristic parameter, the specific image extraction unit extracts the extraction specific image based on a processing result of the character evaluation processing executed before the predetermined limit time elapses.

3. An image processing apparatus connected to a monitoring camera and a display for processing an image input from the monitoring camera, comprising:
an image storage unit for storing an image including an input image input from the monitoring camera;
a characteristic parameter storage unit for storing a characteristic parameter characterizing a specific image extracted from the input image;
a specific image extraction unit, wherein the specific image extraction unit cuts out images having a plurality of predetermined sizes from all parts of the input image stored in the image storage unit, executes character evaluation processing for checking whether or not cut out images have an identical character to the specific image characterized by the characteristic parameter for each cut out image, and extracts the cut out images which are determined to have an identical character to the specific image by the character evaluation processing as an extraction specific image; and
a display image generation unit for generating a display image for displaying a whole image of the input image and the extraction specific image on the display,
wherein the display image generation unit generates a shrunk whole image which is lowered an image Quality as a whole image of the input image to be generated in the display image, and
wherein the display image generation unit generates the shrunk whole image such that the shrunk whole image is projected on a screen which is arranged to face diagonally-forward in the display image.

4. The image processing apparatus according to claim 3, wherein the display image generation unit, further generates a display image where the extraction specific image is arranged at outside of the shrunk whole image, and a lead line connecting a part where the extraction specific image is extracted in the shrunk whole image and the extraction specific image which is arranged at outside of the shrunk whole image.

5. The image processing apparatus according to claim 3, wherein the display image generation unit arranges the extraction specific image at a position of a part where the extraction specific image is extracted in the shrunk whole image.

6. An image processing method in an image processing apparatus connected to a monitoring camera and a display for processing an image input from the monitoring camera,
wherein the image processing apparatus comprises:
an image storage unit for storing an image including an input image input from the monitoring camera; and
a characteristic parameter storage unit for storing a characteristic parameter characterizing a specific image extracted from the input image;
wherein the image processing method executes, steps of:
a step for extracting a specific image, wherein the step for extracting the specific image cuts out images having a plurality of predetermined sizes from all parts of the input image stored in the image storage unit, executes character evaluation processing for checking whether or not cut out images have an identical character to the specific image characterized by the characteristic parameter for each cut out image, and extracts the cut out images which are determined to have an identical character to the specific image by the character evaluation processing as an extraction specific image; and
a step for generating a display image for displaying a whole image of the input image and the extraction specific image on the display,
wherein the image processing apparatus stores a plurality of sets of the characteristic parameter of the specific image in the characteristic parameter storage unit, and in the step for extracting the specific image, executes the character evaluation processing for each of the plurality of sets of the characteristic parameter stored in the characteristic parameter storage unit, and when the cut out image is determined to have identical character to the specific image in every executed character evaluation processing, extracts the cut out image as the extraction specific image,
wherein the image processing apparatus, further
comprises a processing progress information storage unit for storing processing progress information of the character evaluation processing, and in the step for extracting the specific image,
stores identification information of the characteristic parameter indicating that the character evaluation processing is not processed in the processing progress information storage unit when the predetermined limit time elapses before the specific image extraction unit completes the character evaluation processing for all the plurality of sets of the characteristic parameter and the extraction specific image is extracted,
reads out the identification information of the characteristic parameter indicating that the character evaluation processing is not processed from the processing progress information storage unit when the predetermined limit time remains after the specific image extraction unit completes the character evaluation processing for all the plurality of sets of the characteristic parameter, and
executes the character evaluation processing for the characteristic parameter identified by read out identification information.

7. The image processing method according to claim 6, wherein in the step for extracting the specific image, when a predetermined limit time, which is set in advance, elapses before completing the character evaluation processing for all the plurality of sets of the characteristic parameter, the image processing apparatus extracts the extraction specific image based on a processing result of the character evaluation processing executed before the predetermined limit time elapses.

8. The image processing method according to claim 6, wherein the image processing apparatus sets a priority of the processing in regard to the character evaluation processing for the plurality of sets of the characteristic parameter, and in the step for extracting the specific image, executes the character evaluation processing for the plurality of sets of the characteristic parameter based on the priority set by the image processing apparatus.

9. An image processing method in an image processing apparatus connected to a monitoring camera and a display for processing an image input from the monitoring camera,
    wherein the image processing apparatus comprises:
        an image storage unit for storing an image including an input image input from the monitoring camera; and
        a characteristic parameter storage unit for storing a characteristic parameter characterizing a specific image extracted from the input image;
    wherein the image processing method executes, steps of
        a step for extracting a specific image, wherein the step for extracting the specific image cuts out images having a plurality of predetermined sizes from all parts of the input image stored in the image storage unit, executes character evaluation processing for checking whether or not cut out images have an identical character to the specific image characterized by the characteristic parameter for each cut out image, and extracts the cut out images which are determined to have an identical character to the specific image by the character evaluation processing as an extraction specific image; and
        a step for generating a display image for displaying a whole image of the input image and the extraction specific image on the display,
    wherein in the step for generating the display image, the image processing apparatus generates a shrunk whole image which is lowered an image quality as a whole image of the input image to be generated in the display image,
    wherein in the step for generating the display image, the image processing apparatus generates the shrunk whole image such that the shrunk whole image is projected on a screen which is arranged to face diagonally-forward in the display image.

10. The image processing method according to claim 9,
    wherein in the step for generating the display image, the image processing apparatus, further generates a display image where the extraction specific image is arranged at outside of the shrunk whole image, and a lead line connecting a part where the extraction specific image is extracted in the shrunk whole image and the extraction specific image which is arranged at outside of the shrunk whole image.

11. The image processing method according to claim 9,
    wherein in the step for generating the display image, the image processing apparatus arranges the extraction specific image at a position of a part where the extraction specific image is extracted in the shrunk whole image.

* * * * *